United States Patent [19]
Freeman

[11] Patent Number: 5,930,310
[45] Date of Patent: Jul. 27, 1999

[54] INTERFERENCE REDUCTION SCHEME AND METHOD

[75] Inventor: Benedict Russell Freeman, Cambridge, United Kingdom

[73] Assignee: Northern Telecom Limited, Montreal, Canada

[21] Appl. No.: 08/740,278

[22] Filed: Oct. 25, 1996

[30] Foreign Application Priority Data

Nov. 9, 1995 [GB] United Kingdom ................... 9523018

[51] Int. Cl.⁶ ............................... H03D 1/04; H03D 1/06
[52] U.S. Cl. ........................ 375/346; 329/318; 329/319; 329/320
[58] Field of Search ............................ 375/346; 329/318, 329/319, 320, 349, 364; 379/3, 408, 410, 411, 416; 455/291

[56] References Cited

U.S. PATENT DOCUMENTS

| | | | |
|---|---|---|---|
| 4,246,541 | 1/1981 | Ishigaki | 329/132 |
| 4,410,856 | 10/1983 | Van Zanten | 329/50 |
| 4,425,483 | 1/1984 | Lee et al. | 179/170.2 |
| 4,631,489 | 12/1986 | Laird et al. | 329/110 |
| 5,425,052 | 6/1995 | Webster et al. | 375/224 |
| 5,500,879 | 3/1996 | Webster et al. | 375/353 |
| 5,570,395 | 10/1996 | Myers | 375/346 |
| 5,701,598 | 12/1997 | Atkinson | 455/161.2 |

*Primary Examiner*—Stephen Chin
*Assistant Examiner*—Mohammad Ghayour
*Attorney, Agent, or Firm*—Lee, Mann, Smith, McWilliams, Sweeney & Ohlson

[57] ABSTRACT

This invention relates to telecommunications systems. The present invention provides a system and method operable to the cancel interference from digital subscriber line systems. A data signal demodulator having first and second inputs arranged to receive differential data signals and local field RFI signals respectively, wherein a digital adaptive notch filter is formed by DSP means which locates an interferer in the differential signal by adapting its bandwidth and center frequency by adaptation means and wherein the center frequency and bandwidth of the notch filter are used to generate a bandpass filter centered on the interferer and of approximate bandwidth to the interferer; whose output, after processing forms a feedback signal which is sampled, processed, weighted and then combined with the local field RFI input signal of the demodulator, which combined signal is summed with the differential input signal to thereby cancel interference coupled onto the first input.

9 Claims, 2 Drawing Sheets

INTERFERENCE REDUCTION SCHEME AND METHOD

FIELD OF THE INVENTION

This invention relates to data transmission systems and in particular to an interference reduction scheme and method.

BACKGROUND TO THE INVENTION

Most subscribers are coupled to a telecommunications network with a twisted pair wire loop commonly referred to as the subscriber loop. Where high speed data signals are to be sent to the subscriber, this twisted pair connects to a node associated with an optical distribution network which can be some 1000 m away from the subscriber. Such an arrangement is depicted in FIG. 1. The first 950 m or so of cabling 12 from a junction box is covered underground with trunking containing many twisted pairs of underground feeders 14, and the final 50 m or so of wire from a distribution point 16 to a subscriber's installation is normally above ground and consists of an individual twisted pair 18 to each house 20.

In twisted pair copper loop networks, signals are transmitted in differential mode; that is to say, the signals are transmitted along both wires and any Radio Frequency Interference RFI will be picked up by both wires approximately equally with the wanted data signal being determined by the signal between wires at the receiver. Since high speed data is transmitted in this fashion, there should be no transmission problems in such an arrangement. However, there will always be present a certain amount of breakthrough between the common mode and the differential mode and there will always be some interference leaking through differentially, even though the interference is predominantly received in common mode. Typically this differential interference signal may be 30 dB less than the common mode interference signal, but this can cause problems if it is strong enough to distort the output of the associated analogue-to-digital converter, ADC, in addition to providing an increase in the background interference resulting in a corresponding decrease in the output carrier-to-noise ratio, CNR.

Adjacent radio amateurs provide one form of RFI, transmitting in any of the three amateur bands under 10 MHz who are known to cause up to 0 dBm signals to appear differentially on nearby overhead telephone lines. The interference will cause compression problems for the subscriber's ADC which will require the AGC to decrease its gain, causing a loss of dynamic range of signal. Twisted pair wires were originally developed to carry 3 KHz bandwidth; With the advent of services such as video on demand and computer networking, there is a requirement for a larger bandwidth, the provision of which is hampered by the effects of interference as described above.

There are many digital modulation schemes that have been developed, e.g. QAM/CAP, and can be used for subscriber loop schemes as described above. However, all these modulation schemes will be severely affected by interference, especially by high level narrow band interference eg radio amateur transmissions. The interference can cause automatic gain control (AGC) and ADC compression problems if high enough in power, as well as also decreasing the available carrier to noise ratio. Traditional techniques have been based on simple digital filtering techniques in the demodulator which cannot address the AGC/ADC problem. In contrast, analogue cancellation methods benefit from the use of a bandpass filter centred on or near the interferer and of approximate bandwidth to the interferer, which can then be used to determine a feedback loop. In most digital modulation schemes (other than digital multitone (DMT)) this is not readily available.

As a result of interference induced on a transmission line, it may be necessary to cease using channels which are corrupted by the interference, or alternatively to provide additional coding on the affected channels to better protect them from corruption. Both of these methods reduce the bandwidth which is available for the transmission of data.

OBJECT OF THE INVENTION

It is an object of the invention to reduce the effects of interference in data transmission schemes in the subscriber loop. It is a further object of the invention is to provide a scheme whereby interference is reduced in a differential data signal transmission means by way of an analogue reduction method. It is a further object of the present invention to protect data from corruption by interference without putting constraints on the bandwidth available on a transmission line.

SUMMARY OF THE INVENTION

In accordance with the present invention in one aspect, there is provided a data signal demodulator operable to receive differential and local field RFI signals at first and second inputs respectively; wherein the first input is connected to a summation means which is operable to output signals to a cascade arrangement of an automatic gain control means, analogue to digital converter, and signal processor; wherein the signal processor includes an adaptive digital notch filter of variable bandwidth and centre frequency, the centre frequency and bandwidth of the notch filter being varied by means of an adaptation algorithm operating on a feedback signal from the output of the notch filter, to correspond with the centre frequency and the bandwidth of the interference, whereby a bandpass filter can then be formed, replacing the notch filter, by the signal processor the output of which forms a second feedback loop; wherein the second input is connected to a multiplier which is operable to receive an input from the second feedback circuit; and wherein an output from the multiplier is connected to the summation means. The local field signal could be provided by a common mode signal associated with the transmission medium, for example a twisted pair cable.

Preferably the second feedback circuit includes: a processor operable to apply perturbation steps to the digital feedback signal, and convert the digital signal to an analogue complex weight and vector modulate the local field RFI signal with this complex weight.

In accordance with another aspect of the invention, there is provided a method of demodulating a differential signal in the presence of a local field interference signal, comprising: inputting the differential signal to a summation means, the output of which is converted to digital representation and then input into a signal processor which includes a first feedback circuit; generating a notch filter having a frequency and bandwidth corresponding to the centre frequency and bandwidth of the interfering signal, generating a pass band filter in the signal processor which pass band filter is complimentary to the notch filter, feeding back a signal from the signal processor using a second feedback circuit which inputs to a processor, generating a weight signal which is subsequently multiplied with the local field signal by a multiplier; and outputting from the multiplier a signal which is summed with the differential signal by the summation means, whereby the effects of interference are reduced.

Preferably the second feedback circuit applies perturbation steps to the digital feedback signal and converts this digital signal to an analogue weight and vector modulates this local field RFI signal with this analogue weight.

The method reduces interference by the use of an adaptive perturbation algorithm in the second feedback circuit to derive an appropriate weight from a sample of some of the local field signal and using it to reduce the interference that has appeared on the differential mode. This weight can be a single complex analogue weight which will appropriately scale and phase shift the local field signal such that, when it is combined with the differential signal, the interference is decreased.

The output of the ADC, after adaptation, will be the digitised differentially received data signal with reduced interference. This data signal is then passed to the rest of the demodulator circuit and subsequent circuits.

In accordance with another aspect of the invention, there is provided a system for transmission of digital data in the form of a differential signal to a subscriber, comprising a twisted pair for carrying the differential signal to the subscriber's premises, a data signal demodulator operable to receive differential and local field RFI signals picked up by the twisted pair cable at first and second input respectively; wherein the first input is connected to a summation means which is operable to output signals to a cascade arrangement of an automatic gain control means, analogue to digital converter, and a signal processor; wherein the signal processor includes an adaptive digital notch filter of variable bandwidth and centre frequency, the centre frequency and bandwidth of the notch filter being varied by means of an adaptation algorithm operating on a feedback signal from the output of the notch filter, to correspond with the centre frequency and the bandwidth of the interference, whereby a bandpass filter can then be formed, replacing the notch filter, by the signal processor the output of which, after processing, forms a second feedback loop; wherein the second input is connected to a multiplier which is operable to receive an input from the second feedback circuit; and wherein an output from the multiplier is connected to the summation means.

BRIEF DESCRIPTION OF THE DRAWINGS

In order that a greater understanding of the invention may be attained, reference shall now be made to the Figures as shown in the accompanying drawing sheets.

DETAILED DESCRIPTION OF PREFERRED EMBODIMENTS

Figure 1:
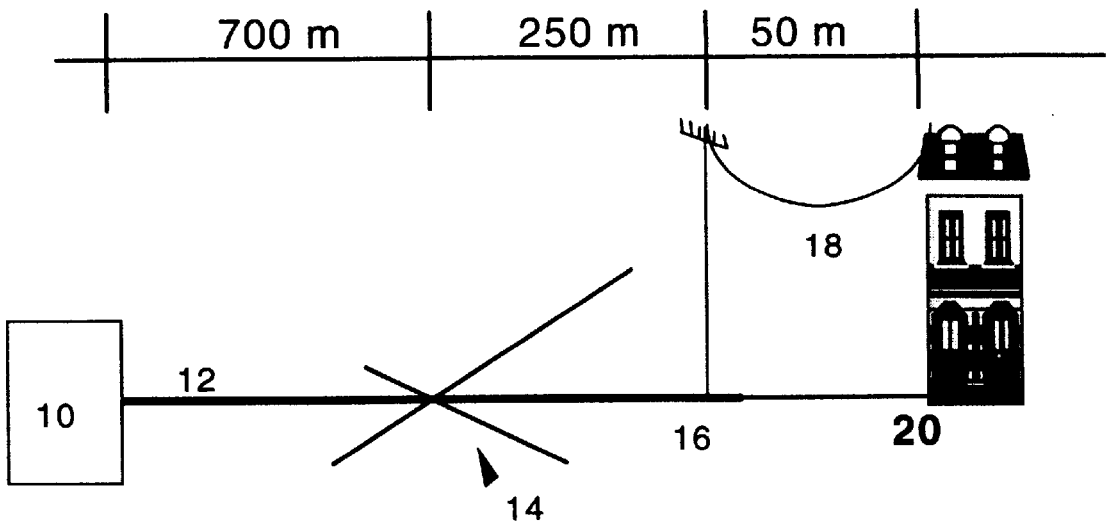
FIG. 1 shows a twisted pair copper loop which connects a node associated with an optical distribution network to a subscriber.
Figure 2:
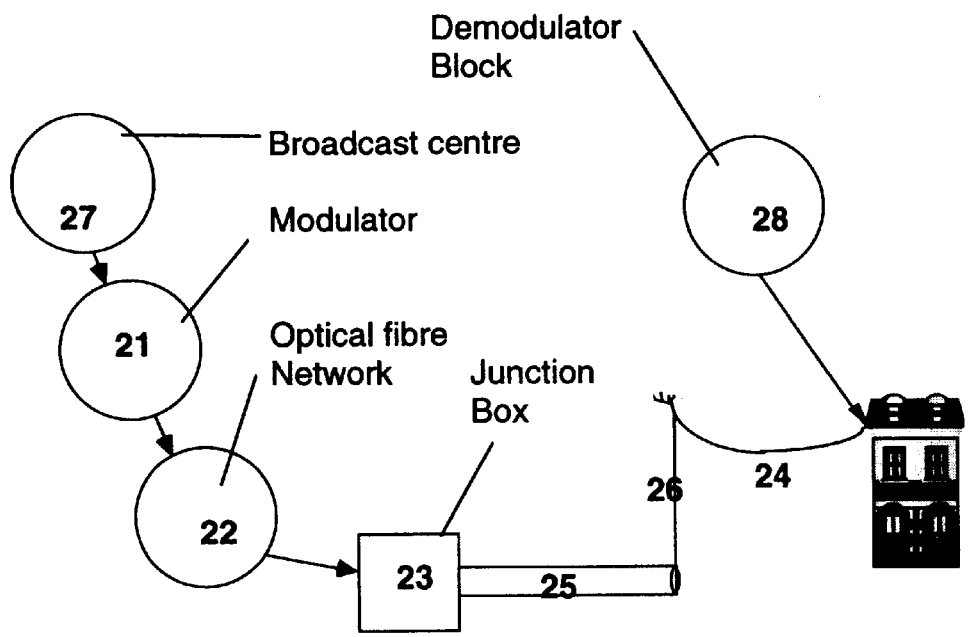
FIG. 2 is a schematic arrangement of a telecommunications system in accordance with an embodiment of the invention.

FIG. 2 shows a representation of a high speed data link suitable for the transmission of both digital data (such as Very Asymmetric Digital Subscriber Loop, VADSL, schemes) and analogue data. A broadcast centre 27 provides, for example, a digital video on demand service; this data is modulated by a modulator 21 and transmitted through a high capacity transmission medium, such as an optical fibre network 22. The optical fibres could support data links for hundreds of video subscribers; through various trunking arrangements, a fibre will terminate at a street-level junction box 23 to serve several subscribers. At this junction box there will be a modulator to serve each subscriber; data will be modulated by these modulators onto twisted wire pair carriers 24. As described in relation to FIG. 1, these twisted pair carriers will be directed through underground trunking 25 until they are required to be supported by pylons and the like 26 when proximate to subscriber's premises 20. The twisted pairs, upon entry to the subscriber's premises, will be passed to a demodulator 28 prior to the data signals being passed to telephones and modems for video on demand, computer networking services and the like. Interference will be picked up by the twisted pairs most readily during transmission from the pylon to the subscriber's premises.

For services such as video on demand, the data rates will tend to be high only from the supplier of the video signals, whereas for computer networks, data rates are likely to be equally high in both transmit and receive modes from each terminal. Accordingly, for the provision of video on demand services, a demodulator as shown in FIG. 3 need only be provided at the subscriber terminal, whereas, for the provision of computer networking arrangements, a demodulator in accordance with FIG. 3 would also be required at the interface between the wires from the underground trunking at the street level junction box 25 prior to transmission to other computers in the network.

Figure 3:
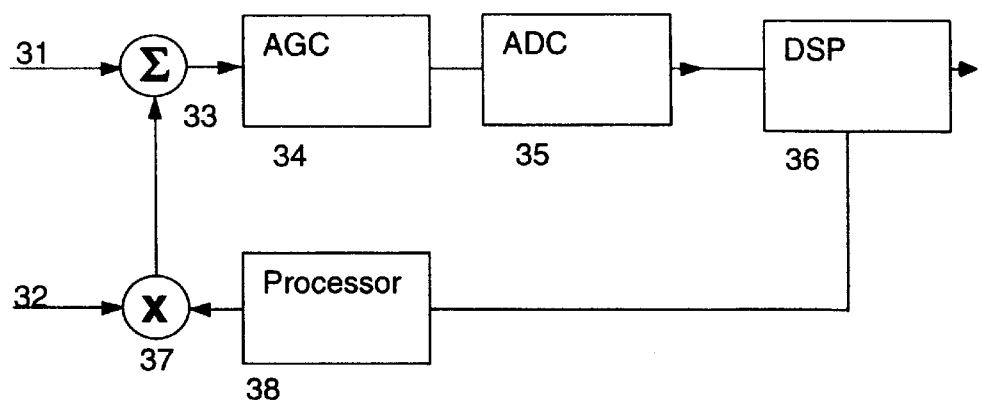
FIG. 3 shows one embodiment of the demodulator 28 of FIG. 2.

FIG. 3 shows a demodulator circuit suitable for use as the demodulator 28 in FIG. 2. The demodulator circuit includes an input summer 33 which receives a differential mode signal and a common mode interference signal multiplied by a feedback signal, which outputs to an automatic gain control circuit 34, an analogue-to-digital converter 35, and a digital signal processor, DSP 36. The DSP outputs to a second feedback circuit, which second feedback circuit includes a processor 38 which applies perturbation steps to the feedback signal; this signal is weighted with a complex weight and is converted to analogue from digital and then multiplied with the common mode input signal at multiplier 37. The combined common mode—feedback signal is summed with the differential input signal of the demodulator whereby local field (common mode) interference coupled with the differential signal can be reduced.

Figure 4:
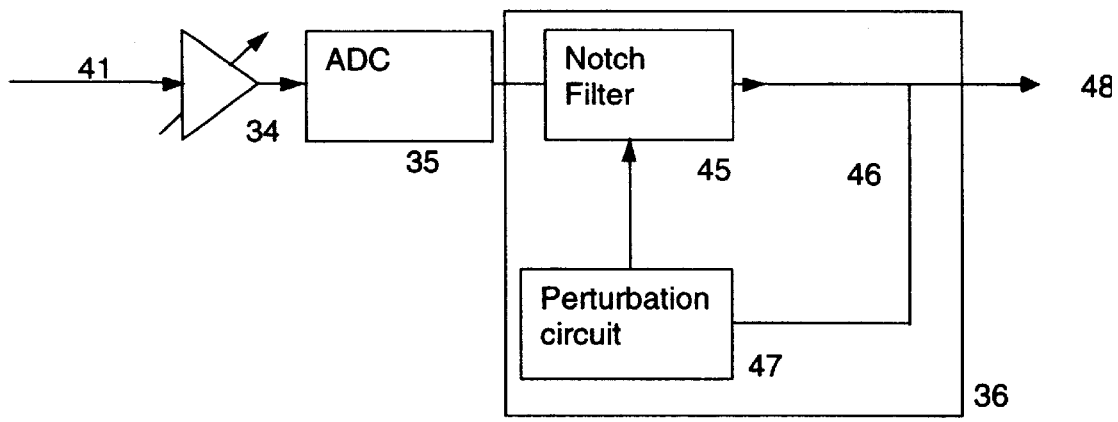
FIG. 4 details digital processing means shown in FIG. 3.

FIG. 4 shows the cascade arrangement of the automatic gain control circuit (AGC) 34, analogue to digital converter 35, and the DSP 36 of FIG. 3. The DSP is operable to form, in a first mode, a notch filter 45, wherein the DSP receives a digital signal input, identifies and locates a source of interference using a feedback circuit 46 which includes a perturbation circuit 47, and in a second mode, a band pass filter. The information relating to the notch filter is utilised to form a band pass filter having characteristics complimentary to the notch filter.

The process will now be considered in more detail, as follows:

Stage 1—Location of the interferer's centre frequency: An adaptive digital notch filter of varying centre frequency and bandwidth will be formed by digital signal processing techniques in the demodulator. The filter will adapt until its centre frequency is directly centred on the interferer. This can be done using an perturbation search adaptation algorithm on the notch filter centre frequency. The bandwidth of the notch filter may vary as the notch filter adapts, to facilitate accurate convergence.

Stage 2—Formation of a feedback loop: The notch filter is discontinued and a band pass filter, BPF, will be formed in the digital signal processor using the same centre frequency and bandwidth as the previous notch filter. This will allow narrow band power detection of the interferer. This power information can then be used for subsequent analogue cancellation.

Stage 3—Analogue cancellation: The single analogue complex weight will now adapt using an adaptation algorithm driven by the second feedback loop, the output of the digital BPF. This will allow analogue cancellation of the RFI from the received differential signal.

I claim:

1. A data signal demodulator operable to receive differential and local field radio frequency interference (RFI) signals at first and second inputs respectively; wherein the first input is connected to a summation means which is operable to output signals to a cascade arrangement of an automatic gain control means, analogue to digital converter, and a signal processor; wherein the signal processor includes an adaptive digital notch filter of variable bandwidth and centre frequency, the centre frequency and bandwidth of the notch filter being varied by means of an adaptation algorithm operating on a feedback signal from the output of the notch filter, to correspond with the centre frequency and the bandwidth of the interference, whereby a bandpass filter can then be formed, replacing the notch filter, by the signal processor the output of which, after processing, forms a second feedback loop; wherein the second input is connected to a multiplier which is operable to receive an input from the second feedback circuit; and wherein an output from the multiplier is connected to the summation means.

2. A demodulator according to claim 1 wherein the local field signal is provided by a common mode signal associated with a twisted pair cable transmission medium.

3. A modulator according to claim 1 wherein the notch filter adaptation algorithm is a perturbation adaptation algorithm.

4. A demodulator according to claim 1 wherein the second feedback loop processor includes a perturbation adaptation algorithm.

5. A demodulator according to claim 1 wherein the output from the analogue to digital converter is passed to subsequent demodulator circuitry.

6. A telecommunications system comprising a demodulator as claimed in claim 1 and arranged to reduce the effects of unwanted signals on a wanted signal in a local subscriber loop.

7. A method of demodulating a differential signal in the presence of a local field interference signal, the method steps comprising: inputting the differential signal to a summation means the output of which is converted to digital representation and then input into signal processor which includes a first feedback circuit; identifying the interference signal, generating a notch filter having a frequency and band width corresponding to the frequency and bandwidth of the interference signal, generating a pass band filter complimentary to the characteristics of the notch filter, feeding back a signal from the signal processor using a second feedback circuit which inputs to a processor, generating a weight signal which is subsequently multiplied with the local field signal by a multiplier; and outputting from the multiplier a signal which is summed with the differential signal by the summation means, whereby the effects of the interference signal are reduced.

8. A method according to claim 7 wherein the second feedback circuit applies perturbation steps to a digital feedback signal and subsequently converts this digital signal to analogue complex weight and vector modulates the local field radio frequency interference (RFI) signal with this complex weight.

9. A method according to claim 7 wherein the differential signal is fed to a twisted pair cable and the interference signal is energy which has been coupled by the cable.

* * * * *